（12）United States Patent
DePue et al.

(10) Patent No.: US 7,293,507 B2
(45) Date of Patent: Nov. 13, 2007

(54) PORTABLE TRAY FOR VEHICLE INTERIOR

(75) Inventors: Todd L. DePue, Brighton, MI (US); Charles Haba, Troy, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 233 days.

(21) Appl. No.: 10/817,510

(22) Filed: Apr. 2, 2004

(65) Prior Publication Data

US 2005/0218681 A1    Oct. 6, 2005

(51) Int. Cl.
  *A47B 23/00*    (2006.01)
(52) U.S. Cl. .......................................... 108/44; 108/152
(58) Field of Classification Search .................. 108/44, 108/45, 152, 42, 48; 224/400
  See application file for complete search history.

(56) References Cited

U.S. PATENT DOCUMENTS

| 817,596 | A | * | 4/1906 | Siebenthal | 108/48 |
|---|---|---|---|---|---|
| 875,840 | A | * | 1/1908 | Olsen | 108/48 |
| 1,671,881 | A | * | 5/1928 | Barrie | 108/48 |
| 2,475,202 | A | * | 7/1949 | Sammons | 108/45 |
| 2,568,102 | A | * | 9/1951 | Weiss | 108/45 |
| 4,099,814 | A | | 7/1978 | Hasselberger | |
| 4,619,386 | A | * | 10/1986 | Richardson | 108/44 |
| 4,756,528 | A | * | 7/1988 | Umashankar | 108/45 |
| 4,830,243 | A | * | 5/1989 | Mann | 108/44 |
| 4,902,061 | A | | 2/1990 | Plavetich et al. | |
| 5,143,337 | A | * | 9/1992 | Tomayko et al. | 108/44 |
| 5,337,677 | A | * | 8/1994 | Peeno | 108/45 |
| 5,623,880 | A | * | 4/1997 | Kuntz | 108/42 |
| 5,671,686 | A | * | 9/1997 | Hurley et al. | 108/45 |
| 5,722,586 | A | * | 3/1998 | Hansen | 108/44 |
| 5,820,194 | A | | 10/1998 | Slayter | |
| 6,206,442 | B1 | | 3/2001 | Breunig | |
| 6,336,413 | B1 | * | 1/2002 | Ball | 108/44 |

* cited by examiner

Primary Examiner—Jose V. Chen
(74) Attorney, Agent, or Firm—Bliss McGlynn, P.C.

(57) ABSTRACT

A portable tray for use at multiple locations of the interior of a vehicle includes a body adapted to be operatively supported to the interior of the vehicle and defining at least one substantially planar work surface. The tray also includes a support mechanism connected to the body and adapted to removably support the body to structural components of the interior of the vehicle such that the tray can be manually moved and used at various locations within the interior of the vehicle.

7 Claims, 4 Drawing Sheets

PORTABLE TRAY FOR VEHICLE INTERIOR

BACKGROUND OF THE INVENTION

1. Field of the Invention

The present invention relates, generally, to a tray and, more specifically, to a portable tray for use in the interior of a vehicle.

2. Description of the Related Art

In a passenger compartment of a motor vehicle, such as a car, minivan, sport-utility vehicle, or truck, it may be desirable on occasion to have a work surface located proximate the driver and/or any passenger of the vehicle to use for drinking, eating, reading, working on a laptop computer, or writing, for instance, during operation of the vehicle. Accordingly, many modern vehicle-interior designs are configured to provide a working surface, such as a tray, at each of various locations of the passenger compartment. A typical vehicle-interior tray is adapted to move between a retracted, stored position within the glove compartment, center stack of the dashboard, a console, an armrest, and/or a seat, for example, and an extended, flat, deployed position.

Although these known trays can be readily concealed when they are not in use, they are generally permanently fixed to the respective locations. Unfortunately, some of these trays are not used sufficiently frequently such that they just take up valuable design space of the vehicle interior that could be used for more valuable features. These trays also can compromise space for occupants of the vehicle and adversely affect aesthetics in the vehicle. Because the space available in vehicle interiors is limited, these trays further can be objectionable in the vehicle interior because they tend to crowd or clutter the interior space. For example, a seat tray is usually positioned on the back of a front seat and is extendable to the deployed position. However, such an assembly often requires an oversized tray so that the tray can extend from the front seat over the knees of a seated rear passenger. Unfortunately, when the oversized tray is stored, the back of the corresponding front seat has no or limited space available to allocate for storage of other features.

In addition, many vehicles include only a limited number of trays such that they do not provide sufficient work space for all of the occupants of the vehicle. More specifically, some vehicles include, at most, only a single tray to serve as a work space for use by the driver and/or a passenger of the front seat. In such case, an occupant of the front seat may have to share a tray with another front-seat occupant. Alternatively, an occupant of the front seat may not have any access to a work space. Similarly, occupants of the back seat often do not have any access to a work space to use for the above-mentioned activities.

Accordingly, there remains a need in the related art for work space at more locations of the interior of a vehicle. More particularly, there remains a need in the related art for a single, relatively inexpensive tray that can be easily and quickly moved to and supported at each of various locations within the vehicle interior. Furthermore, there remains a need in the related art for such a tray that also can be stored in various locations within the vehicle interior such that the tray does not compromise valuable space or features of the vehicle interior.

SUMMARY OF THE INVENTION

The present invention overcomes the disadvantages in the related art in a portable tray for use at multiple locations of the interior of a vehicle. The tray includes a body adapted to be operatively supported to the interior of the vehicle and defining at least one substantially planar work surface. The tray also includes a support mechanism connected to the body and adapted to removably support the body to structural components of the interior of the vehicle such that the tray can be manually moved and used at various locations within the interior of the vehicle.

The portable tray for a vehicle interior of the present invention can provide a work space at various locations within the vehicle interior and can be easily and quickly supported to a particular location of the vehicle interior. In addition, the portable tray is relatively light and small such that it can be easily and quickly moved to various locations within the vehicle interior. Furthermore, the portable tray can be stored in various locations within the vehicle interior such that it does not compromise valuable space or features of the vehicle interior. The portable tray is relatively inexpensive to manufacture and can be customized to display and mount certain articles.

Other objects, features, and advantages of the present invention will be readily appreciated as the same becomes better understood while reading the subsequent description when taken in conjunction with the accompanying drawings.

DETAILED DESCRIPTION OF THE INVENTION

Figure 1:
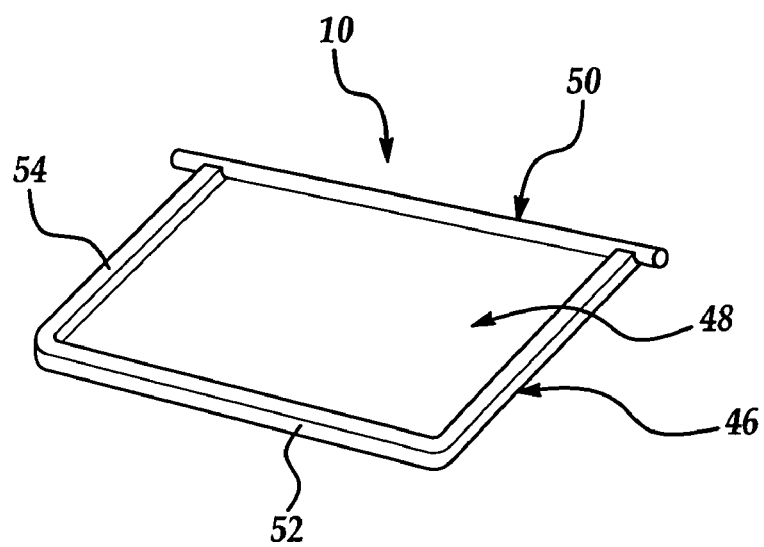
FIG. 1 is a perspective view of the portable tray of the present invention showing the body and the support mechanism of the tray.

A portable tray for use at multiple locations of the interior of a vehicle according to the present invention is generally indicated at 10 throughout the figures, where like numerals are used to designate like structure. Although the tray 10 is described below and shown in the figures used in connection with the passenger compartment of a motor vehicle, such as a car, minivan, sport-utility vehicle (SUV), truck, or boat, it will be appreciated by those having ordinary skill in the art that the tray 10 can be used in connection with any suitable non-motorized vehicle as well. It will also be appreciated that the tray 10 can be used with any suitable area of such a vehicle, such as a cargo area. It will further be appreciated that the tray 10 finds special applicability in relatively larger vehicles, the interior of which can accommodate more occupants and structural features and components.

Referring now to FIGS. 2, 3, 5, 7, and 8, the interior, or, more specifically, the passenger compartment, of a motor vehicle is shown generally indicated at 12 and includes a center console, generally indicated at 14. The console 14 includes a lidded bin 16 and a forward portion that may define a receptacle 18 integrally extending from the bin 16. The console 14 also is typically located between a pair of front seats and extends longitudinally from the dashboard, generally indicated at 20, to the second row of seating (not shown). The dashboard 20 has built into it various structural features, such as a glove compartment, generally indicated at 22, and a center stack, generally indicated at 24. A door 26 is hingedly connected to the glove compartment, and the interior of the glove compartment 22 defines a pair of opposed, spaced side walls, generally indicated at 28. The door 26 is adapted to be moved between a "closed" position closing the glove compartment 22 and an extended, flat, "opened" position opening the glove compartment 22.

Figure 9:
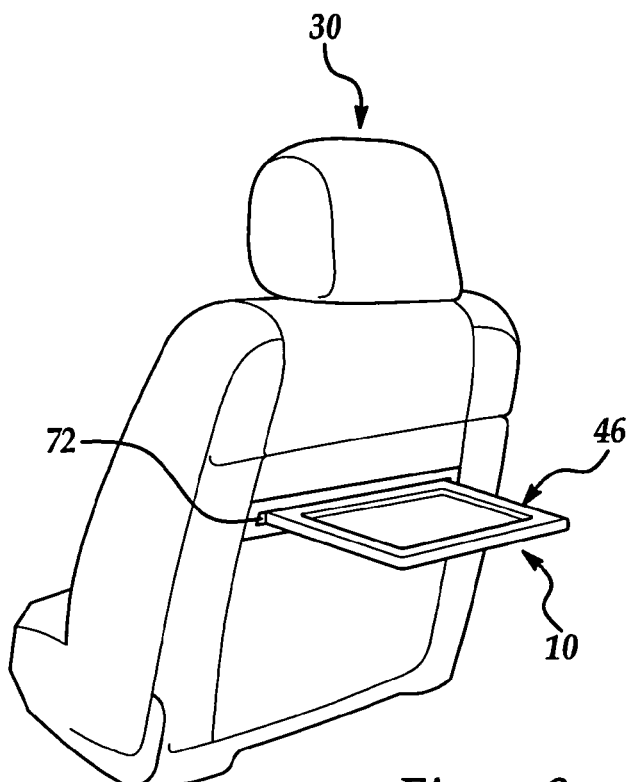
FIG. 9 is an environmental view of the portable tray of the present invention removably supported in cantilevered and stationary fashion to the rear of a seat of the passenger compartment of a motor vehicle.
Figure 10:
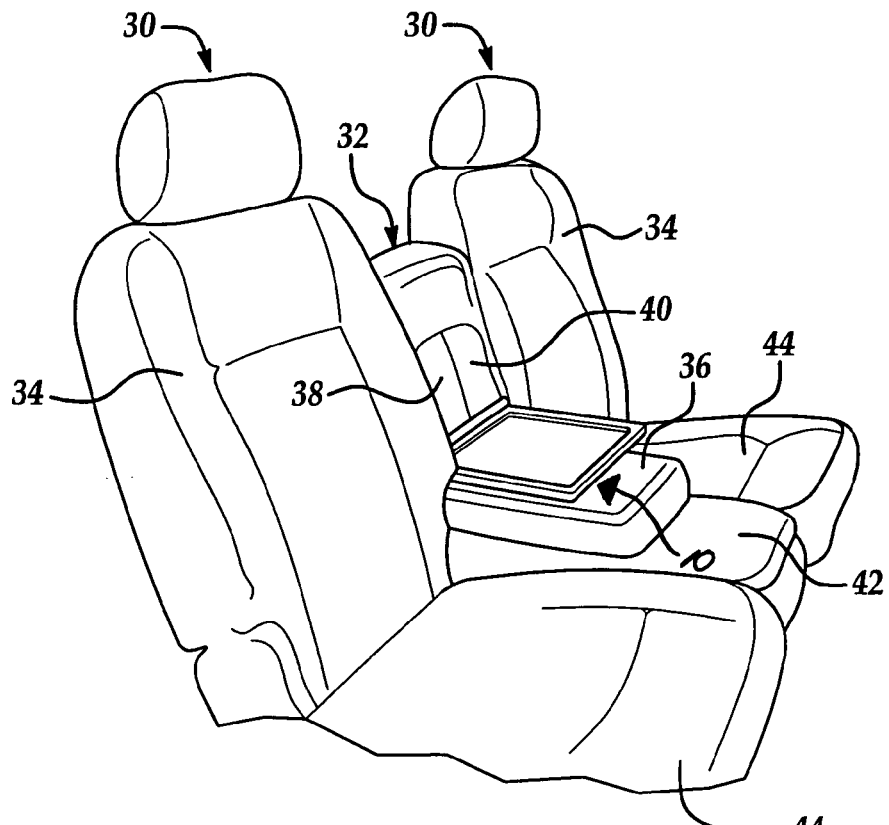
FIG. 10 is an environmental view of the portable tray of the present invention removably supported in cantilevered and non-stationary fashion to a seat backing of the passenger compartment of a motor vehicle and resting on an armrest.

A passenger compartment 12 also typically includes at least one seat, generally indicated at 30 in FIG. 9, and typically a pair of seats 30, as shown in FIG. 10. An upper-arm support backing, generally indicated at 32, is frequently located between respective back supports 34 of the seats 30 and includes an armrest 36. The support backing 32 defines a recess 38, which, in turn, defines a pair of opposed, spaced side walls 40 within the support backing 32. The armrest 36 is adapted to move between a retracted, stored position within the recess 38 and an extended, flat, "deployed" position on a seat cushion 42 disposed between respective bases 44 of the seats 30 for use by any occupants thereof.

Those having ordinary skill in the art will appreciate that a center console 14 and corresponding bin 16 and receptacle 18, a dashboard 20 and corresponding glove compartment 22 and center stack 24, and seats 30 are standard features of a passenger compartment 12 and the tray 10 can be used with such features, for example, having various structural designs and structural relationships with respect to the passenger compartment 12. The tray 10, however, is not limited to use in connection with only these features. Rather, the tray 10 can be used in connection with other suitable structural features of the interior of a vehicle.

As shown in the figures, the tray 10 includes a body, generally indicated at 46, adapted to be operatively supported to the interior of the vehicle and defining at least one substantially planar work surface, generally indicated at 48. The tray 10 also includes a support mechanism, generally indicated at 50, connected to the body 46 and adapted to removably support the body 46 to structural components of the interior of the vehicle such that the tray 10 can be manually moved and used at various locations within the interior of the vehicle.

In a preferred embodiment and as shown in FIG. 1, the body 46 is substantially rectangular and has substantially arcuate corners. The body 46 includes a pair of spaced and substantially parallel and co-extensive planar surfaces 48 adapted to act as work surfaces. The body 46 further includes an edge 52 extending between the planar surfaces 48 and disposed about the periphery of the planar surfaces 48. It will be appreciated by those having ordinary skill in the art that the body 46 can have any suitable size and shape defining at least one substantially planar work surface 48 for holding or carrying articles. It will also be appreciated that the body 46 can be made of any suitable material, but, preferably, a lightweight one, such as plastic.

Also preferably, one of the planar surfaces 48 defines a raised edge 54 disposed about the periphery of at least a portion of the planar surface 48 and adapted to retain articles on the planar surface 48. More specifically, the planar surface 48 shown in FIG. 3 defines a uniform raised edge 54 disposed about substantially the entirety of the periphery of the planar surface 48 and substantially perpendicular to the planar surface 48. The edge 54 is raised only slightly relative to the area of the planar surface 48. The raised edge 54 is also integral with the planar surface 48.

Figure 2:
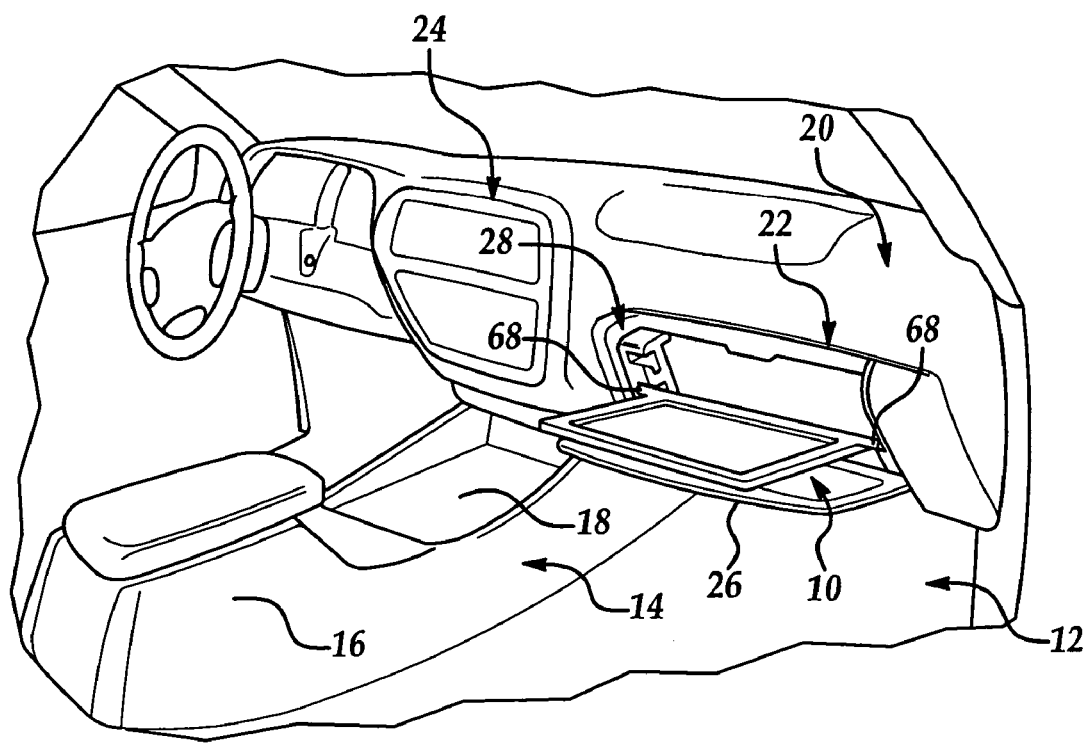
FIG. 2 is an environmental view of the portable tray of the present invention illustrated in FIG. 1 showing the tray removably supported in cantilevered and non-stationary fashion to an opened glove compartment of the passenger compartment of a motor vehicle and resting on the door of the glove compartment for use as an extra work surface.

However, it will be understood by those having ordinary skill in the art that the raised edge 54 can be disposed any suitable distance about the planar surface 48 and have any suitable width. It will also be understood that the raised edge 54 can be non-uniform, segmented, and raised to any suitable height above and at any suitable angle with respect to the planar surface 48. It will also be understood that the raised edge 54 can be non-integral with the planar surface 48. It will also be understood that each of the planar surfaces 48 can define a raised edge 54. For example and as shown in FIG. 2, the other planar surface 48 of the tray 10 shown in FIG. 3 defines a raised edge 54 substantially identical to that shown in FIG. 3.

It is also preferred that at least one of the planar surfaces 48 includes at least one clip 56 attached to the planar surface 48 for holding and displaying articles. More specifically, the planar surface 48 shown in FIG. 3 includes a substantially linear, uniform clip 56 attached to an area of the interior of the planar surface 48 for holding and displaying notes 58 and driving directions 60, for example. The clip 56 is disposed adjacent, relatively slightly spaced from, and substantially parallel with one of the longitudinal sides of the planar surface 48. The clip 56 also extends a length of the planar surface 48 such that a pair of relatively small spaces are defined substantially equidistantly between the ends of the clip 56 and the corresponding sides of the raised edge 54. However, those having ordinary skill in the art will appreciate that the clip 56 can have any suitable size, shape, and structure and any suitable structural relationship with respect to the planar surface 48 for holding and displaying articles.

Figure 7:
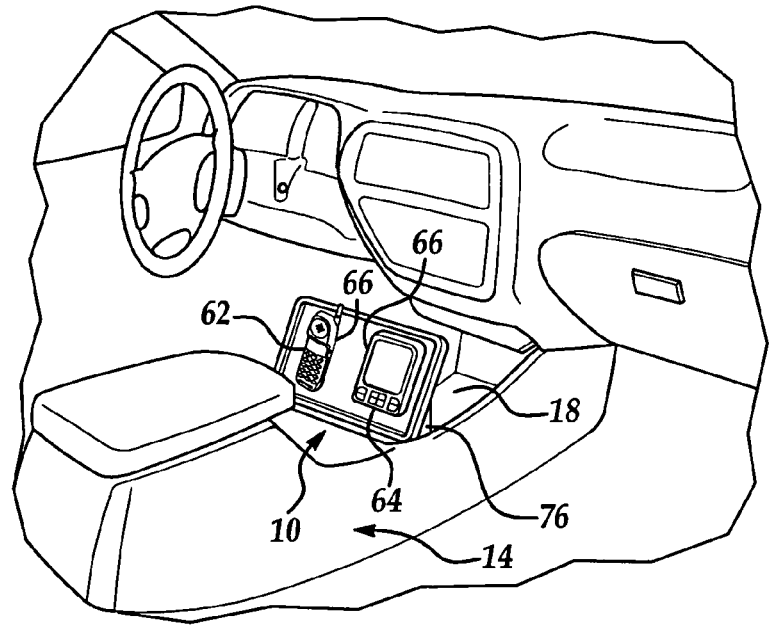
FIG. 7 is an environmental view of the portable tray of the present invention disposed in an inclined position and removably supported in non-cantilevered and stationary fashion against a center console of the passenger compartment of a motor vehicle for use as a mounting surface.

It is also preferred that the body 46 be adapted to removably mount articles. For instance, the body 46 of the tray 10 shown in FIG. 7 is adapted to removably mount a cellular telephone 62 and a PDA 64. To this end, the body 46 defines a pair of recesses 66 in the body 46 adapted to correspondingly removably mount the telephone 62 and the PDA 64. More specifically, the pair of complementary recesses 66 are disposed substantially symmetrically with respect to the interior of the planar surface 48. Those having ordinary skill in the art will understand that the body 46 can include any suitable number of recesses 66, which can have any suitable structural relationship with respect to the body 46. Those having ordinary skill in the art will also understand that each recess 66 can be designed to mount any suitable article.

In a preferred embodiment of the tray 10 and referring back to FIG. 1, the support mechanism 50 is substantially rod-like and extends along a longitudinal edge 52 of the body 46. Alternatively, the support mechanism 50 can define the longitudinal edge 52. The support mechanism 50 also can have a substantially circular or rectangular, for example, cross-section and, as shown in FIG. 1, be substantially co-extensive with respect to the depth of the body 46. Preferably, the support mechanism 50 is also integrally connected to the body 46. However, it will be appreciated by those having ordinary skill in the art that the support mechanism 50 can have any suitable size, shape, and structural relationship with respect to the body 46 and be non-integrally connected to the body 46.

Figure 3:
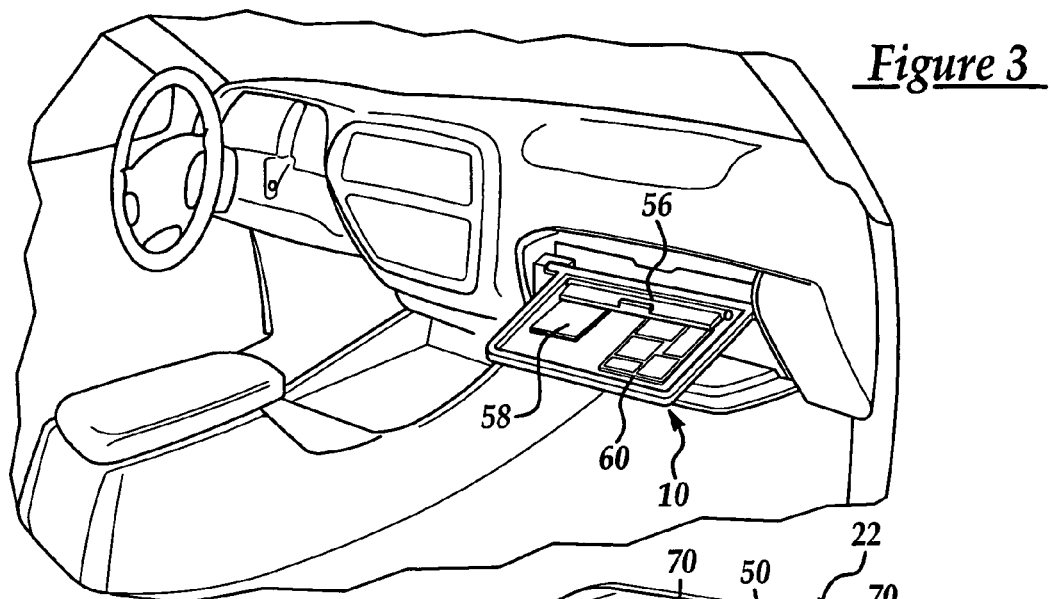
FIG. 3 is an environmental view of the portable tray of the present invention showing the other side of the tray illustrated in FIG. 2 disposed in an inclined position for use as a display surface.

The body 46 can be removably supported to a particular feature of the interior of the vehicle, such as the glove compartment 22 shown in FIGS. 2 and 3 or the support backing 32 shown in FIG. 10, in cantilevered and non-stationary fashion such that the body 46 can rotate about the support mechanism 50. To this end and as shown in FIGS. 2 through 4 and 10, the support mechanism 50 can include at least one mounting tab 68 extending outwardly from the body 46, or, support mechanism 50.

Figure 4:
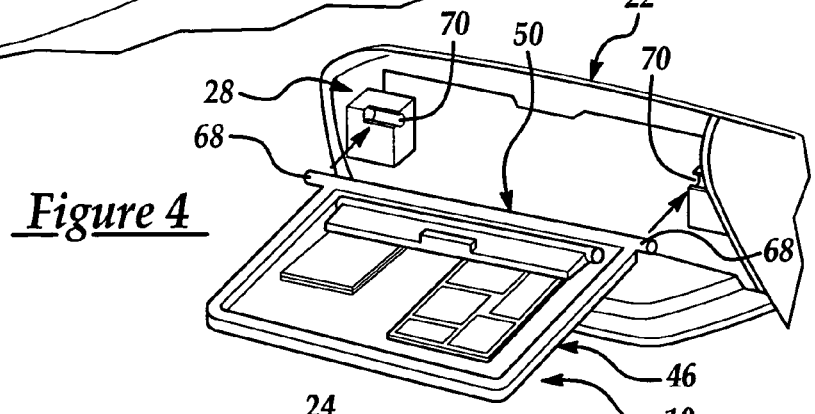
FIG. 4 is an exploded view of a portion of the support mechanism of the portable tray illustrated in each of FIGS. 2 and 3 adapted to be received by a structural component of the glove compartment such that the tray is removably supported in cantilevered and non-stationary fashion to the glove compartment.

With reference to the tray 10 shown in FIGS. 2 through 4, when the door 26 is moved to the "opened" position, the tab 68 is adapted to be received by a structural component 70 defined by the corresponding side wall 28 of the interior of the glove compartment 22 such that the body 46 is supported in cantilevered fashion and can rotate about the support mechanism 50. Preferably, a pair of spaced mounting tabs 68 extend outwardly from the body 46 in substantially opposite directions and are adapted to be received by a pair of such corresponding structural components 70. More specifically, each structural component can be a recess 70, for example, adapted to matingly receive the respective tab 68 such that the body 46 is removably supported to the side walls 28 in cantilevered fashion and can rotate about the support mechanism 50. As a result, the body 46 can rest on the rear side of the door 26 for use as an extra work surface, as shown in FIG. 2, or disposed in an inclined position for use as a display surface, as shown in FIG. 3.

With reference to the tray 10 shown in FIG. 10, when the armrest 36 is moved to the "deployed" position, the support mechanism 50 is adapted to be received within the recess 38. The mounting tabs 68 can then be interferingly fitted against the respective side walls 40 of the pliable interior of the support backing 32 such that the body 46 is removably supported to the support backing 32 in cantilevered fashion and can rotate about the support mechanism 50. As a result, the body 46 can rest on the armrest 36.

However, it will be understood by those having ordinary skill in the art that the support mechanism 50 can have any suitable structure and structural relationship with respect to a suitable component or suitable components 70 of a particular feature of a vehicle interior to support the body 46 to such component or components 70 in cantilevered and non-stationary fashion such that the body 46 can rotate about the support mechanism 50.

Figure 8:
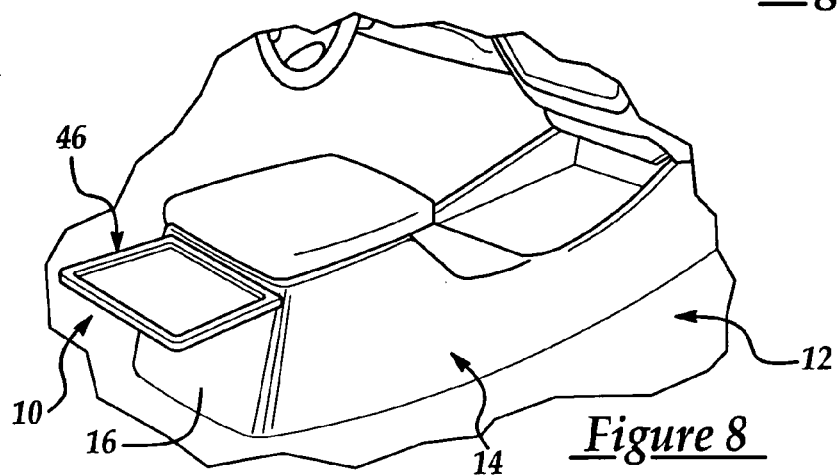
FIG. 8 is an environmental view of the portable tray of the present invention removably supported in cantilevered and stationary fashion to the rear of a center console of the passenger compartment of a motor vehicle for use as a table for rear passengers of the vehicle.

It will also be understood that the body 46 can be removably supported to any particular vehicle-interior feature in cantilevered and stationary fashion as well. For example, FIGS. 8 and 9 show the tray 10 disposed in a level position and supported in cantilevered and stationary fashion to the rear side of the bin 16 of the center console 14 for use as a table for rear passengers of the vehicle and to the rear of a seat 30, respectively. In these figures, a recess 72, as shown in FIG. 9, is defined in the rear side of the bin 16 and the rear of the seat 30 and adapted to matingly receive a support mechanism 50 such that the corresponding body 46 is prevented from rotating about the support mechanism 50. In this way, the corresponding body 46 is removably supported to the rear of the bin 16 and seat 30 in cantilevered and stationary fashion.

Figure 5:
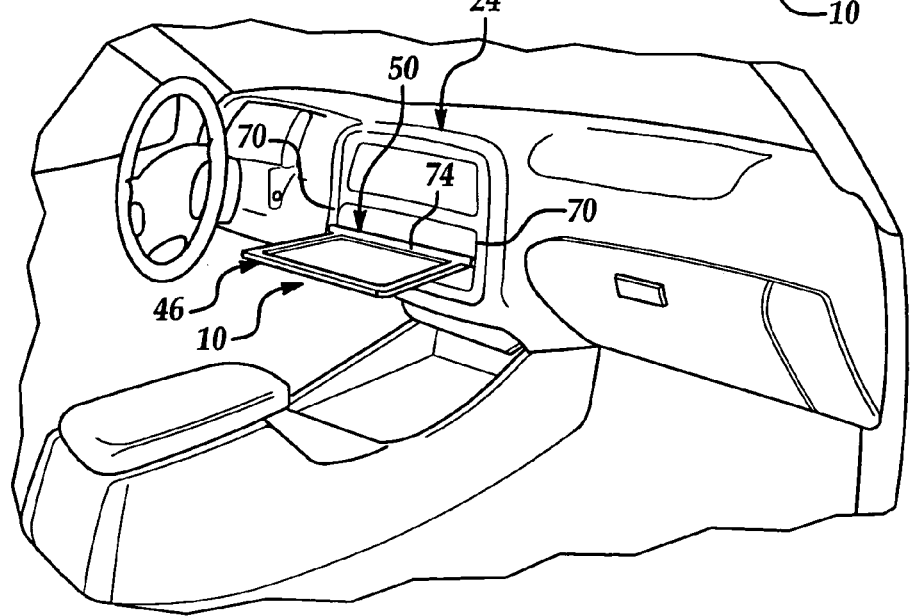
FIG. 5 is an environmental view of the portable tray of the present invention removably supported in cantilevered and stationary fashion to a center stack of the passenger compartment of a motor vehicle for use as an extra work surface.
Figure 6:
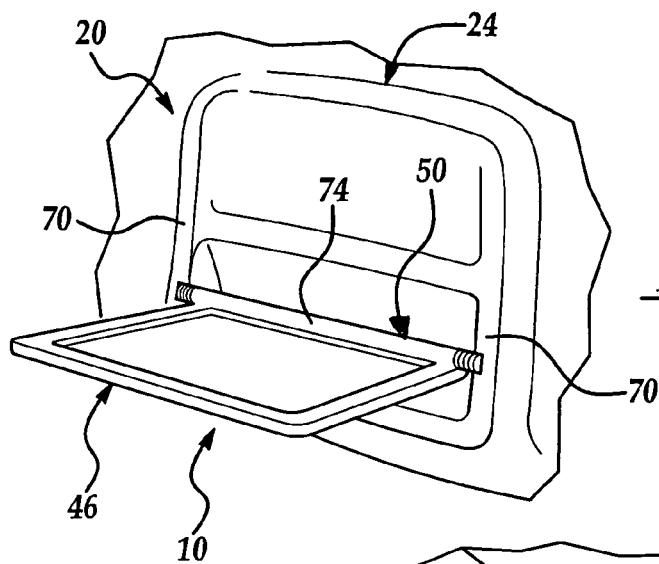
FIG. 6 is a perspective view of the portable tray illustrated in FIG. 5 disposed in contacting relationship with a structural component of the center stack such that the tray is removably supported in cantilevered and stationary fashion to the center stack.

In an alternative embodiment of the tray 10, the body 46 can be removably supported to the interior of the vehicle, such as the center stack 24, also in cantilevered and stationary fashion. To this end and as shown in FIGS. 5 and 6, the support mechanism 50 can include a biasing member 74 adapted to be disposed between and in contacting relationship with a pair of spaced structural components, such as protruding edges 70, of the center stack 24. The biasing member 74 is also adapted to apply a retaining force in opposite directions with respect to the disposition of the biasing member 74 and against the respective protruding edges 70 such that the body 46 is prevented from rotating about the support mechanism 50. In this way, the body 46 is removably supported to the center stack 24 in cantilevered and stationary fashion.

It is preferred that the biasing member is a spring-biased dowel 74. In equilibrium, the dowel 74 extends substantially beyond at least one transverse edge 48 and, preferably, both transverse edges 52 of the body 46.

As shown in FIG. 7, the body 46 can further be removably supported to the interior of the vehicle in non-cantilevered and stationary fashion as well. To this end, the body 46 can include at least one leg 76 extending from the body 46 and adapted to be supported against at least one structural feature of the interior of the vehicle, such as the center console 14. More specifically, the leg 76 shown in FIG. 7 is supported against the receptacle 18 of the console 14. In this way, the tray 10 is removably supported against the console 14 in non-cantilevered and stationary fashion. Those having ordinary skill in the art will appreciate that the body 46 can include any suitable number of legs 76, each of which can have any suitable size, shape, and structural relationship with respect the body 46.

It will be understood by those having ordinary skill in the art that the support mechanism 50 can removably support the body 46 to a particular feature of the interior of the vehicle in cantilevered and stationary fashion by any suitable means. It will also be understood that the support mechanism 50 can so support the body 46 in a fashion other than cantilevered by any suitable means.

In operation, the tray 10 is manually moved to a particular suitable location within a passenger compartment 12 of a motor vehicle, for example, where the tray 10 is desired to be used. Then, the support mechanism 50 and, thus, the body 46 of the tray 10 are removably supported to a suitable structural feature, such as an "opened" glove compartment 22, of the passenger compartment 12. More specifically, the support mechanism 50 is removably supported to suitable structural components, such as recesses 70 defined in the interior side walls 28 of the glove compartment 22. The tray 10 can be supported in cantilevered and non-stationary fashion so as to rest on the rear side of the door of the glove compartment 22, for instance. Alternatively, the tray 10 can be supported in cantilevered and stationary fashion or in non-cantilevered fashion. Furthermore, the body 46 can be disposed in either a level or an inclined position.

Alternatively, the support mechanism 50 is not employed, and, instead, a leg or legs 76 of the tray 10 is/are supported against a suitable structural feature of the passenger compartment 12, such as the center console 14. In this way, the tray 10 is operatively supported in a stationary fashion and disposed in an inclined position. Of course, the tray 10 can be unsupported altogether and free-standing. In any event, the planar surface 48 can act as a working, displaying, and/or mounting surface for a variety of articles. In addition, the tray 10 can be easily and quickly manually removed from the "opened" glove compartment 22 and manually moved to and used at another particular suitable location within the passenger compartment 12, such as the rear of a seat 30. Moreover, the tray 10 can be stored in any suitable location, such as within the bin 16 of the center console 14 or under a seat 30, when the tray 10 is not in use.

As can easily be seen, the tray 10 can provide a work space at various locations within the vehicle interior. The tray 10 can also be customized to display and mount certain articles, be easily and quickly supported to a particular location of the vehicle interior, and be stored in various locations within the vehicle interior such that it does not compromise valuable space or features of the vehicle interior. The tray 10 also is relatively light and small such that it can be easily and quickly moved to various locations within the vehicle interior and relatively inexpensive to manufacture.

The present invention has been described in an illustrative manner. It is to be understood that the terminology that has been used is intended to be in the nature of words of description rather than of limitation. Many modifications and variations of the present invention are possible in light of the above teachings. Therefore, within the scope of the appended claims, the present invention may be practiced other than as specifically described.

What is claimed is:

1. A portable tray for use at multiple locations of the interior of a vehicle comprising:
   a body adapted to be operatively supported to the interior of the vehicle and defining at least one substantially planar work surface; and
   a spring-biased dowel integrally and unitarily connected to said body and adapted to removably support said body to a pair of opposed, spaced structural components of the interior of the vehicle such that said tray can be manually moved and used at various locations within the interior of the vehicle;
   wherein said spring-biased dowel extends at and along an edge of said body and is adapted to be disposed between and in contacting relationship with the structural components and apply a retaining force in opposite directions with respect to the disposition of said spring-biased dowel and against the structural components such that said body is operatively supportable to the interior of the vehicle in cantilevered and stationary fashion and wherein said body includes at least one leg extending from said body and adapted to be supported against at least one structural component of the interior of the vehicle such that said tray is operatively supportable against the interior of the vehicle in non-cantilevered and stationary fashion.

2. A portable tray as set forth in claim 1, wherein said body includes a pair of spaced and substantially parallel and co-extensive planar surfaces and an edge extending between said planar surfaces and disposed about the periphery thereof.

3. A portable tray as set forth in claim 2, wherein at least one of said pair of planar surfaces defines a raised edge disposed about at least a portion of said planar surface and adapted to retain articles on said planar surface.

4. A portable tray as set forth in claim 2, wherein at least one of said pair of planar surfaces includes at least one clip attached thereto for holding articles.

5. A portable tray as set forth in claim 1, wherein said body is adapted to removably mount a cellular telephone.

6. A portable tray as set forth in claim 5, wherein said body defines a recess within said body adapted to removably mount the cellular telephone.

7. A vehicle comprising:
   an interior of said vehicle including a plurality of structural components; and
   a portable tray for use at multiple locations of said interior, said tray including:
   a body adapted to be operatively supported to said interior and defining at least one substantially planar work surface; and
   a spring-biased dowel integrally and unitarily connected to said body and adapted to removably support said body to a pair of opposed, spaced structural components of said plurality of structural components such that said tray can be manually moved and used at various locations within said interior;
   wherein said spring-biased dowel extends at and along an edge of said body and is adapted to be disposed between and in contacting relationship with said pair of structural components and apply a retaining force in opposite directions with respect to the disposition of said spring-biased dowel and against said pair of structural components such that said body is operatively supportable to said interior in cantilevered and stationary fashion and wherein said body includes at least one leg extending from said body and adapted to be supported against at least one of said plurality of structural components such that said tray is operatively supportable against said interior in non-cantilevered and stationary fashion.

* * * * *